United States Patent
Sannohe (10) Patent No.: US 7,165,846 B2
(45) Date of Patent: Jan. 23, 2007

(54) DICHROIC MIRROR AND PROJECTION-TYPE DISPLAY UNIT

(75) Inventor: Shinya Sannohe, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 248 days.

(21) Appl. No.: 10/508,071

(22) PCT Filed: Mar. 28, 2003

(86) PCT No.: PCT/JP03/03934

§ 371 (c)(1),
(2), (4) Date: Sep. 15, 2004

(87) PCT Pub. No.: WO03/083528

PCT Pub. Date: Oct. 9, 2003

(65) Prior Publication Data

US 2005/0225730 A1    Oct. 13, 2005

(30) Foreign Application Priority Data

Apr. 1, 2002   (JP) .............................. 2002-098364

(51) Int. Cl.
G03B 21/00 (2006.01)
G03B 21/26 (2006.01)
G03B 21/28 (2006.01)
G03B 27/14 (2006.01)

(52) U.S. Cl. ........................... 353/31; 353/37; 353/98; 359/634

(58) Field of Classification Search ................. 353/31, 353/37, 98; 349/5; 359/634
See application file for complete search history.

(56) References Cited

U.S. PATENT DOCUMENTS

| 5,999,321 A | 12/1999 | Bradley | 359/587 |
| 6,310,729 B1 * | 10/2001 | Tsukamoto | 359/634 |
| 2002/0135706 A1 * | 9/2002 | Sawamura | 349/5 |

FOREIGN PATENT DOCUMENTS

| JP | 4-372922 | | 12/1992 |
| JP | 11-101913 | * | 4/1999 |
| JP | 11-202127 | | 7/1999 |
| JP | 2001-318221 | | 11/2001 |

* cited by examiner

*Primary Examiner*—Melissa Jan Koval
(74) *Attorney, Agent, or Firm*—Hamre, Schumann, Mueller & Larson, P.C.

(57) ABSTRACT

On a transparent substrate (1), a first alternating periodic layer (5) including low-refractive-index layers (2) and high-refractive-index layers (3), a second alternating periodic layer (6) including the low-refractive-index layers (2) or the high-refractive-index layers (3) and intermediate-refractive-index layers (4), and a third alternating periodic layer (7) including the low-refractive-index layers (2) and the high-refractive-index layers (3) are provided in this order. The refractive index of the intermediate-refractive-index layers (4) is higher than that of the low-refractive-index layers (2) and lower than that of the high-refractive-index layers (3). Furthermore, the intermediate-refractive-index layers (4) contain materials for the low-refractive-index layers (2) and the high-refractive-index layers (3). A dichroic mirror thus configured has a narrow color separating band between a transmission wavelength band and a reflection wavelength band, and therefore has a satisfactory color separating efficiency. Accordingly, a projection-type display unit using the dichroic mirror provides satisfactory color reproduction while retaining a high spectrum utilization efficiency.

12 Claims, 12 Drawing Sheets

DICHROIC MIRROR AND PROJECTION-TYPE DISPLAY UNIT

TECHNICAL FIELD

The present invention relates to a dichroic mirror with a dielectric multi-layered film stacked on a transparent substrate, which selectively transmits and reflects light with an arbitrary wavelength, and a projection-type display unit for magnifying and projecting an optical image formed on a light valve onto a screen with the dichroic mirror.

BACKGROUND ART

Conventionally, a projection-type display unit is well known, which forms an optical image in accordance with a video signal on a light valve, and illuminates the optical image with light to magnify and project the optical image onto a screen with a projection lens so as to obtain a large screen video image. If three light valves are used corresponding to light beams of three primary colors of red, green, and blue, a projected image with high resolution and satisfactory color reproduction can be displayed.

A projection-type display unit using three light valves generally includes a light source, an illumination optical system for condensing light emitted from the light source onto light valves, the light valves, a color separating and synthesizing optical system for separating white light from the light source into light beams of three primary colors of red, green, and blue in an illumination optical path, and synthesizing the light beams of three primary colors output from the light valves into one light beam, and a projection lens for magnifying and projecting optical images formed on the light valves onto a screen.

Among the optical performance characteristics of a projected image displayed on the screen, resolution mainly is determined by the number of pixels of the light valves and the resolving power of the projection lens, light output mainly is determined by the total amount of light output from the light source, the condensing efficiency of the illumination optical system, the light utilization efficiency of the light valves, and the spectrum utilization efficiency of the color separating and synthesizing optical system, and color reproduction is determined by the spectral characteristics of the color separating and synthesizing optical system.

Among them, the color separating and synthesizing optical system, contributing to the light output and color reproduction, mostly has a configuration in which a blue reflecting dichroic mirror for reflecting blue light and transmitting red light and green light, and a red reflecting dichroic mirror for reflecting red light and transmitting green light and blue light are used to separate white light into light beams of three primary colors of red, green, and blue and synthesize the light beams of three primary colors (e.g., see JP4(1992)-372922A).

Hereinafter, a conventional color separating and synthesizing optical system will be described below, which uses, for example, a blue reflecting dichroic mirror configured so that the incident angle of light from air is 47.4°, and a red reflecting dichroic mirror interposed between two prism-shaped glass substrates in contact with each other and configured so that the incident angle of light from glass is 10°.

Figure 10A:
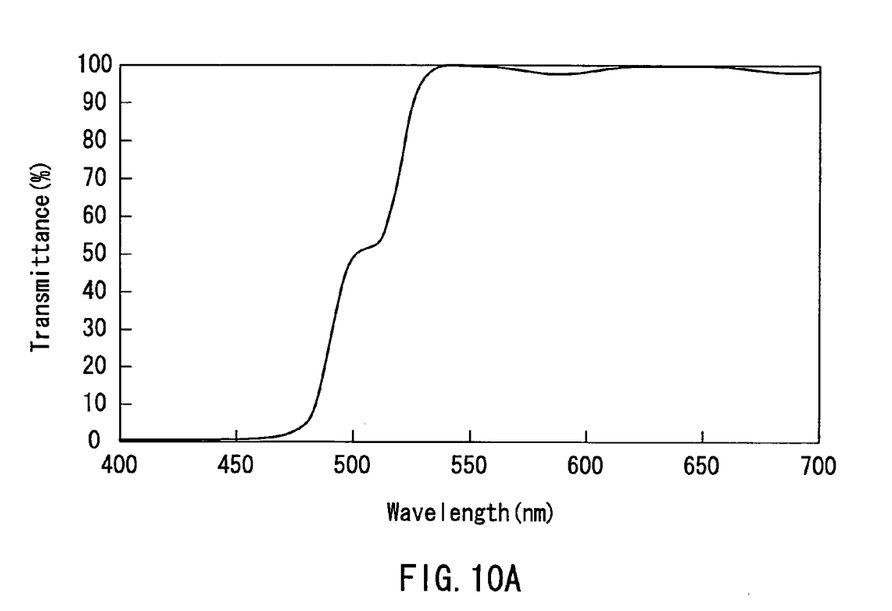
FIG. 10A is a graph showing spectral transmittance characteristics of a conventional blue reflecting dichroic mirror.
Figure 10B:
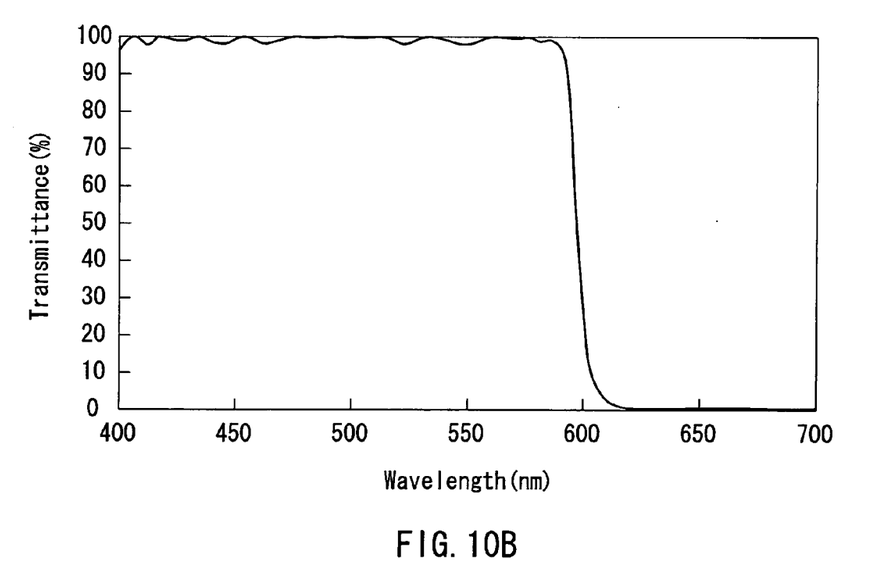
FIG. 10B is a graph showing spectral transmittance characteristics of a conventional red reflecting dichroic mirror.

FIG. 10A is a graph showing a spectral transmittance of the blue reflecting dichroic mirror, and FIG. 10B is a graph showing a spectral transmittance of the red reflecting dichroic mirror. Both the dichroic mirrors have a configuration in which alternating periodic layers each including dielectric thin films as low-refractive-index layers and dielectric thin films as high-refractive-index layers are stacked on a glass substrate, and $SiO_2$ with a refractive index of 1.46 is used for the low-refractive-index layers, and $Nb_2O_5$ with a refractive index of 2.3 is used for the high-refractive-index layers. The blue reflecting dichroic mirror has a wavelength exhibiting a transmittance of 50% (hereinafter referred to as a "half-value wavelength"), which is a wavelength band for separating blue light from green light, in the vicinity of 505 nm, and the red reflecting dichroic mirror has a half-value wavelength for separating red light from green light in the vicinity of 595 nm. It is understood that, in the red reflecting dichroic mirror, the transmittance curve in the vicinity of a half-value wavelength has a linear shape, whereas in the blue reflecting dichroic mirror, the transmittance curve in the vicinity of a half-value wavelength has a step shape in the vicinity of a transmittance of 50%.

Figure 11:
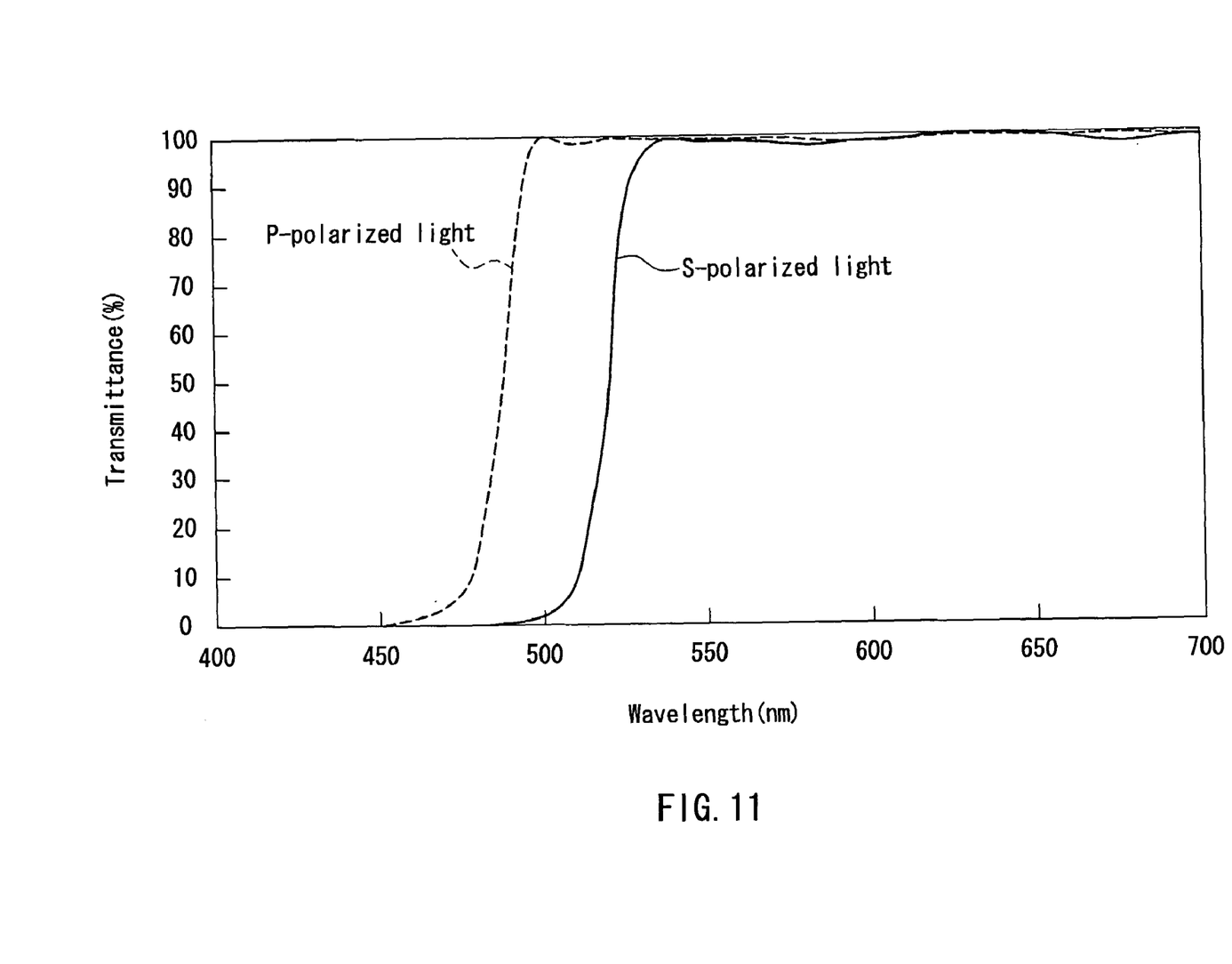
FIG. 11 is a graph showing spectral transmittance characteristics regarding S-polarized light and P-polarized light in the conventional blue reflecting dichroic mirror.

The reason for this is that the incident angle of light with respect to the blue reflecting dichroic mirror is large. More specifically, as the incident angle is increased, the difference in half-value wavelength of a transmittance curve between S-polarized light and P-polarized light becomes larger as shown in FIG. 11, so that average light thereof has characteristics as shown in FIG. 10A. Herein, the S-polarized light refers to linearly polarized light whose plane of polarization is vertical to a plane including a normal line to a dichroic mirror surface and a light traveling direction, and the P-polarized light refers to linearly polarized light whose plane of polarization is vertical to the S-polarized light.

Figure 12:
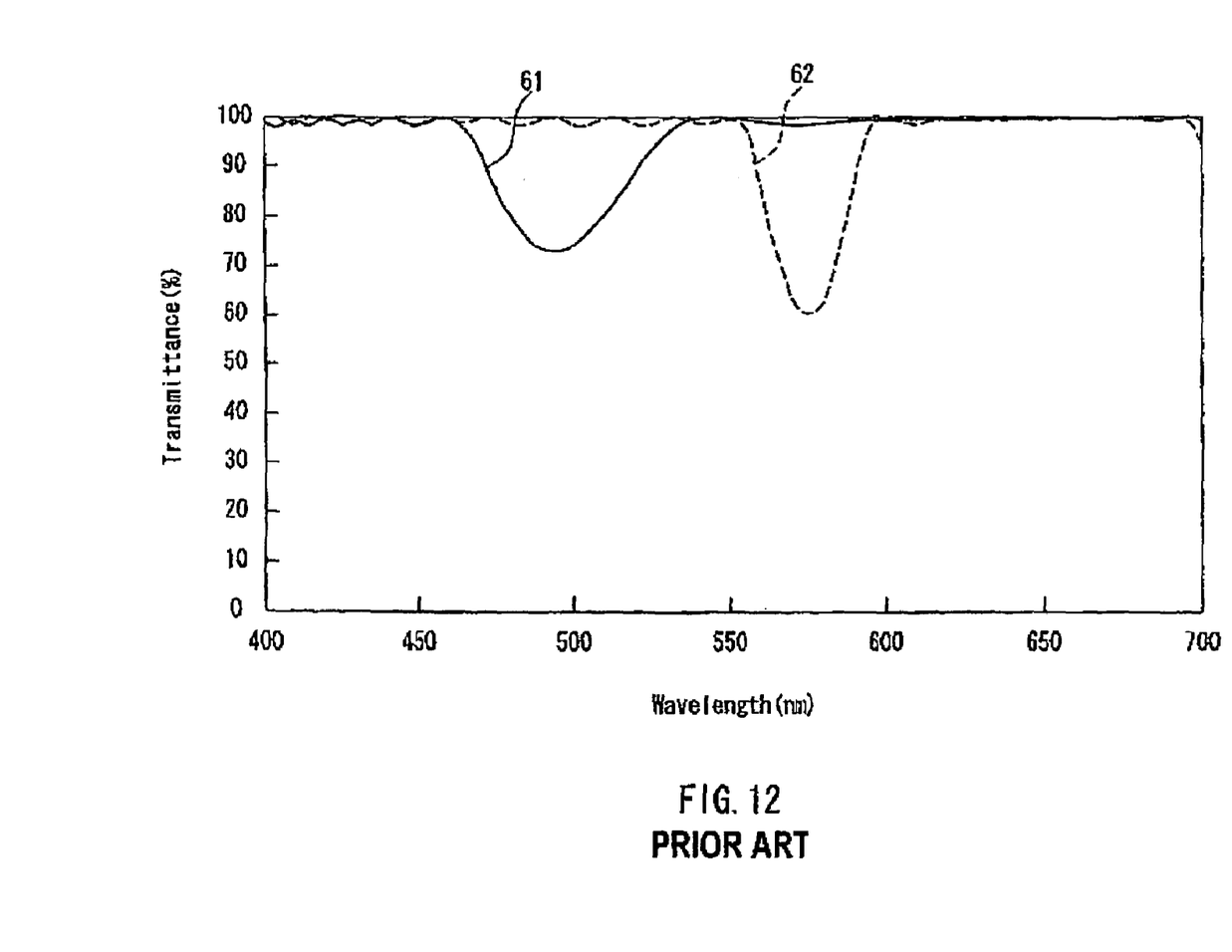
FIG. 12 is a graph showing spectral transmittance characteristics of color correction filters used together with the conventional blue reflecting dichroic mirror.

In the case of the blue reflecting dichroic mirror shown in FIG. 10A, the spectral transmittance curve in the vicinity of a half-value wavelength has a step shape, so that a part of a wavelength band on a blue side is transmitted on a green side, and a part of a wavelength band on the green side is reflected on the blue side, which degrades each color purity. Furthermore, if an attempt is made to enhance the color purity with this configuration, it is necessary to add, for example, a first color correction filter 61 for reflecting cyan light, and a second color correction filter 62 for reflecting yellow light for adjusting the chromaticity of white light whose chromaticity characteristics are changed due to the use of the first color correction filter 61, as shown in FIG. 12, which results in a large decrease in a spectrum utilization efficiency.

Thus, if a wavelength separating curve in the vicinity of a half-value wavelength also is linear in the blue reflecting dichroic mirror shown in FIG. 10A in the same way as in the red reflecting dichroic mirror shown in FIG. 10B, and the separation width between a reflection wavelength band and a transmission wavelength band can be decreased, the color reproduction and spectrum utilization efficiency can be satisfied.

DISCLOSURE OF INVENTION

A first object of the present invention is to provide a dichroic mirror with satisfactory wavelength separating characteristics even in the case of a large incident angle. Furthermore, a second object of the present invention is to provide a projection-type display unit with satisfactory color reproduction of a projected image and spectrum utilization efficiency.

In order to achieve the above-mentioned object, a first dichroic mirror of the present invention includes: on a transparent substrate, a first alternating periodic layer including low-refractive-index layers and high-refractiveindex layers; a second alternating periodic layer including intermediate-refractive-index layers and the high-refractive-index layers; and a third alternating periodic layer including the low-refractive-index layers and the high-refractive-index layers in this order. A refractive index of the intermediate-refractive-index layers is higher than that of the low-refractive-index layers and lower than that of the high-refractive-index layers, and the intermediate-refractive-index layers contain materials for the low-refractive-index layers and the high-refractive-index layers.

Furthermore, a second dichroic mirror of the present invention includes: on a transparent substrate, a first alternating periodic layer including low-refractive-index layers and high-refractive-index layers; a second alternating periodic layer including the low-refractive-index layers and the intermediate-refractive-index layers; and a third alternating periodic layer including the low-refractive-index layers and the high-refractive-index layers in this order. A refractive index of the intermediate-refractive-index layers is higher than that of the low-refractive-index layers and lower than that of the high-refractive-index layers, and the intermediate-refractive-index layers contain materials for the low-refractive-index layers and the high-refractive-index layers.

Furthermore, a projection-type display unit of the present invention includes: a light source; a light valve as image forming means; an illumination optical system for condensing light emitted from the light source onto the light valve; a color separating and synthesizing optical system for separating illumination light from the illumination optical system into light beams of three primary colors of red, green, and blue, and synthesizing the light beams of three primary colors; and a projection lens for magnifying and projecting an optical image formed on the light valve onto a screen. The color separating and synthesizing optical system includes at least one of the above-mentioned first and second dichroic mirrors of the present invention.

BEST MODE FOR CARRYING OUT THE INVENTION

A dichroic mirror of the present invention includes a second alternating periodic layer including low-refractive-index layers or high-refractive-index layers and intermediate-refractive-index layers between first and third alternating periodic layers including low-refractive-index layers and high-refractive-index layers. The refractive index of the intermediate-refractive-index layers is higher than that of the low-refractive-index layers and lower than that of the high-refractive-index layers, and the intermediate-refractive-index layers contain materials for the low-refractive-index layers and the high-refractive-index layers. Because of this, even in the case of a large incident angle, a dichroic mirror with satisfactory wavelength separating characteristics can be realized.

Furthermore, in the projection-type display unit of the present invention, a color separating and synthesizing optical system includes at least one dichroic mirror of the present invention. Because of this, a projection-type display unit with satisfactory color reproduction of a projected image and spectrum utilization efficiency can be provided.

Hereinafter, embodiments of the present invention will be described with reference to FIGS. 1 to 9.

(Embodiment 1)

Figure 1:
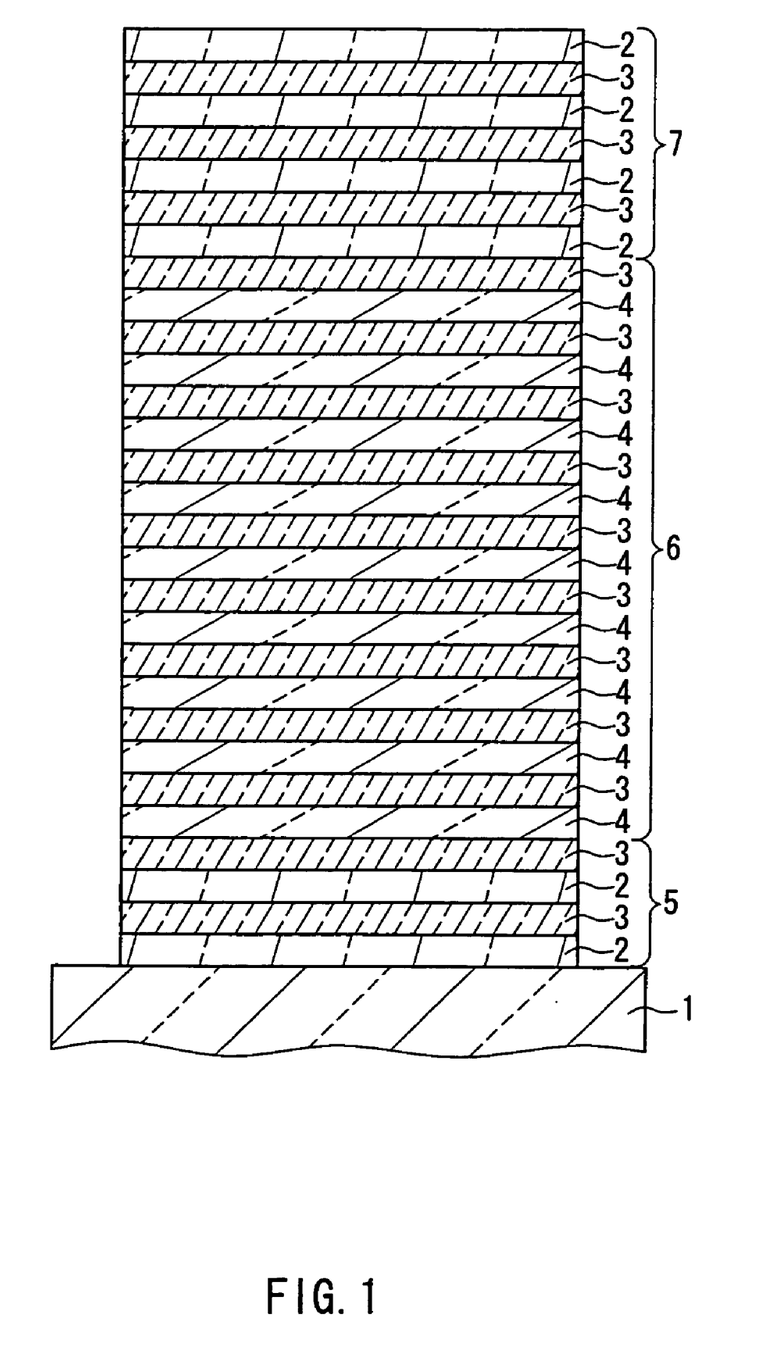
FIG. 1 is a cross-sectional view showing a schematic configuration of a blue reflecting dichroic mirror according to Embodiment 1 of the present invention.

FIG. 1 is a cross-sectional view showing a schematic configuration of a blue reflecting dichroic mirror according to Embodiment 1 of the present invention. In FIG. 1, reference numeral 1 denotes a transparent glass substrate, 2 denotes a low-refractive-index layer, 3 denotes a high-refractive-index layer, 4 denotes an intermediate-refractive-index layer, 5 denotes a first alternating periodic layer, 6 denotes a second alternating periodic layer, and 7 denotes a third alternating periodic layer.

Table 1 shows the material and film thickness of each layer in FIG. 1. The main design wavelength is 475 nm, and the film thickness of each layer in Table 1 is displayed in terms of an optical film thickness obtained by multiplying the refractive index of a thin film by the physical film thickness thereof, wherein the film thickness that is ¼ of the main design wavelength is assumed to be 1.

TABLE 1

| Medium | Material Air | Film thickness |
| --- | --- | --- |
| 29 | $SiO_2$ | 1.423 |
| 28 | $Nb_2O_5$ | 0.557 |
| 27 | $SiO_2$ | 0.617 |
| 26 | $Nb_2O_5$ | 1.586 |
| 25 | $SiO_2$ | 0.748 |
| 24 | $Nb_2O_5$ | 0.844 |
| 23 | $SiO_2$ | 0.942 |
| 22 | $Nb_2O_5$ | 1.217 |

TABLE 1-continued

| Medium | Material Air | Film thickness |
|---|---|---|
| 21 | SiO$_2$/Nb$_2$O$_5$ | 0.841 |
| 20 | Nb$_2$O$_5$ | 1.217 |
| 19 | SiO$_2$/Nb$_2$O$_5$ | 0.841 |
| 18 | Nb$_2$O$_5$ | 1.217 |
| 17 | SiO$_2$/Nb$_2$O$_5$ | 0.841 |
| 16 | Nb$_2$O$_5$ | 1.217 |
| 15 | SiO$_2$/Nb$_2$O$_5$ | 0.841 |
| 14 | Nb$_2$O$_5$ | 1.217 |
| 13 | SiO$_2$/Nb$_2$O$_5$ | 0.841 |
| 12 | Nb$_2$O$_5$ | 1.217 |
| 11 | SiO$_2$/Nb$_2$O$_5$ | 0.841 |
| 10 | Nb$_2$O$_5$ | 1.217 |
| 9 | SiO$_2$/Nb$_2$O$_5$ | 0.841 |
| 8 | Nb$_2$O$_5$ | 1.217 |
| 7 | SiO$_2$/Nb$_2$O$_5$ | 0.841 |
| 6 | Nb$_2$O$_5$ | 1.217 |
| 5 | SiO$_2$/Nb$_2$O$_5$ | 0.841 |
| 4 | Nb$_2$O$_5$ | 1.169 |
| 3 | SiO$_2$ | 0.708 |
| 2 | Nb$_2$O$_5$ | 0.941 |
| 1 | SiO$_2$ | 1.957 |
| Substrate | BK7 | |

The first alternating periodic layer 5 including the low-refractive-index layers 2 and the high-refractive-index layers 3; the second alternating periodic layer 6 including the intermediate-refractive-index layers 4 and the high-refractive-index layers 3, and the third alternating periodic layer 7 including the low-refractive-index layers 2 and the high-refractive-index layers 3 are formed successively on the transparent glass substrate 1. The number of periods of the second alternating periodic layer 6 is 9, the total number of layers thereof is 18, and the total number of layers of the first alternating periodic layer 5 and the third alternating periodic layer 7 is 11. Thus, there are 29 layers as a whole.

The low-refractive-index layers 2 are made of SiO$_2$ and have a refractive index of 1.46. The high-refractive-index layers 3 are made of Nb$_2$O$_5$ and have a refractive index of 2.3. The intermediate-refractive-index layers 4 are made of a mixed layer containing SiO$_2$ of the low-refractive-index layers 2 and Nb$_2$O$_5$ of the high-refractive-index layers 3, and have a refractive index of 1.7. The low-refractive-index layers 2 and the high-refractive-index layers 3 can be formed by vapor deposition. Furthermore, the intermediate-refractive-index layers 4 can be formed by simultaneously vapor-depositing SiO$_2$ and Nb$_2$O$_5$, and a desired refractive index is obtained by regulating each film-formation speed to control the mixed ratio. If reactive sputtering that uses a Si substrate and a Nb substrate as vapor deposition targets is adopted as a film-formation method, satisfactory intermediate-refractive-index layers with high reproducibility of a refractive index can be formed.

In the present embodiment, Nb$_2$O$_5$ is used for the high-refractive-index layers; however, instead of this, any of Ta$_2$O$_5$, TiO$_2$, and ZrO$_2$, or a mixture thereof may be used.

The first alternating periodic layer 5 and the third alternating periodic layer 7 have functions of obtaining a wavelength band sufficient for reflecting blue light, and minimizing ripples generated in a transmission wavelength band of green light and red light by optimizing a film thickness. Furthermore, the second alternating periodic layer 6 has a function of subjecting blue light and green light to wavelength separation satisfactorily.

Figure 2:
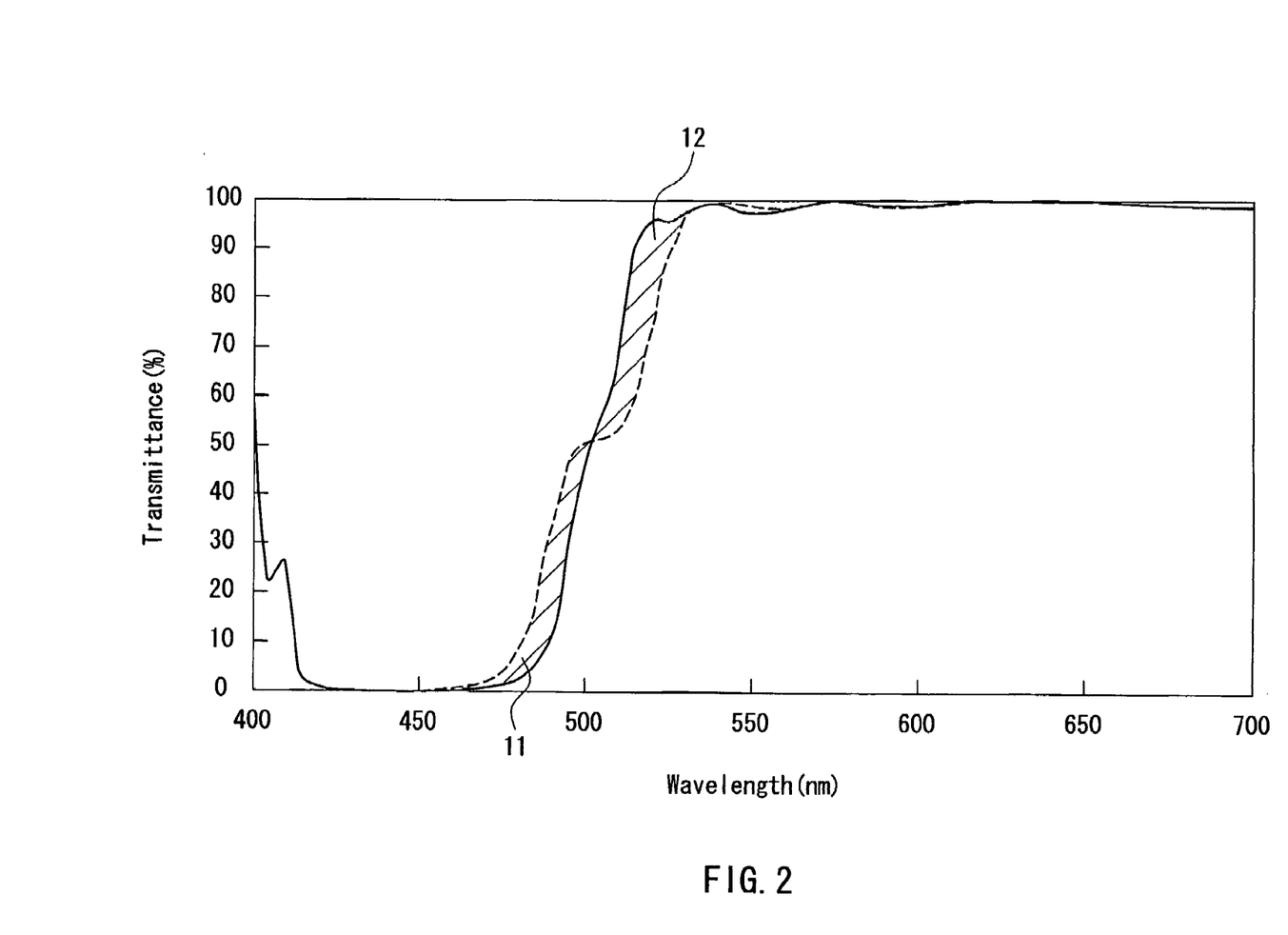
FIG. 2 is a graph showing spectral transmittance characteristics of the blue reflecting dichroic mirror according to Embodiment 1 of the present invention.

FIG. 2 shows spectral transmittance characteristics of a blue reflecting dichroic mirror with a multi-layered film configuration shown in FIG. 1 and Table 1. In FIG. 2, the solid line indicates a spectral transmittance of the blue reflecting dichroic mirror of the present embodiment, and the broken line indicates a spectral transmittance of the conventional blue reflecting dichroic mirror shown in FIG. 10A. The incident angle of light from a medium (air) side is 47.4° in the present embodiment in the same way as in the conventional example. As is understood from the comparison with the spectral transmittance curve of the conventional example, if the multi-layered film configuration of the present embodiment is used, a curve in a wavelength separating band in the vicinity of a half-value wavelength is linear, blue light 11 in a shaded portion transmitted on a green side in the conventional example can be reflected on a blue side, and green light 12 in the shaded portion reflected on a blue side in the conventional example can be transmitted on a green side.

In the case of configuring a dichroic mirror of the present embodiment as described above, the refractive index of the intermediate-refractive-index layer 4 desirably is 1.6 to 1.8. In the case where the refractive index is smaller than 1.6, the curve in the wavelength separating band of spectral transmittance characteristics approaches the broken line in FIG. 2, whereby satisfactory wavelength separating performance that is a feature of the present invention is unlikely to be obtained. Furthermore, in the case where the refractive index is larger than 1.8, the difference in refractive index with respect to the high-refractive-index layers 3 configuring the second alternating periodic layer 6 becomes small, whereby a reflection wavelength band sufficient for reflecting blue light is unlikely to be obtained.

Furthermore, the number of periods of the second alternating periodic layer 6 desirably is 7 to 12. In the case where the number of periods is smaller than 7, the satisfactory wavelength separating characteristics as in the present embodiment shown in FIG. 2 are unlikely to be obtained. In the case where the number of periods is larger than 12, a change in spectral transmittance characteristics is decreased, and hence, the effect of the increase in number of periods is decreased.

Furthermore, the total number of layers of the first alternating periodic layer 5 and the third alternating periodic layer 7 desirably is 7 to 12. In the case where the total number of layers is smaller than 7, a reflection wavelength band sufficient for blue light is unlikely to be obtained, or sufficient reflectance is unlikely to be obtained. In the case where the total number of layers is larger than 12, a change in spectral transmittance characteristics is decreased, and hence, the effect of the increase in number of layers is decreased.

Figure 3:
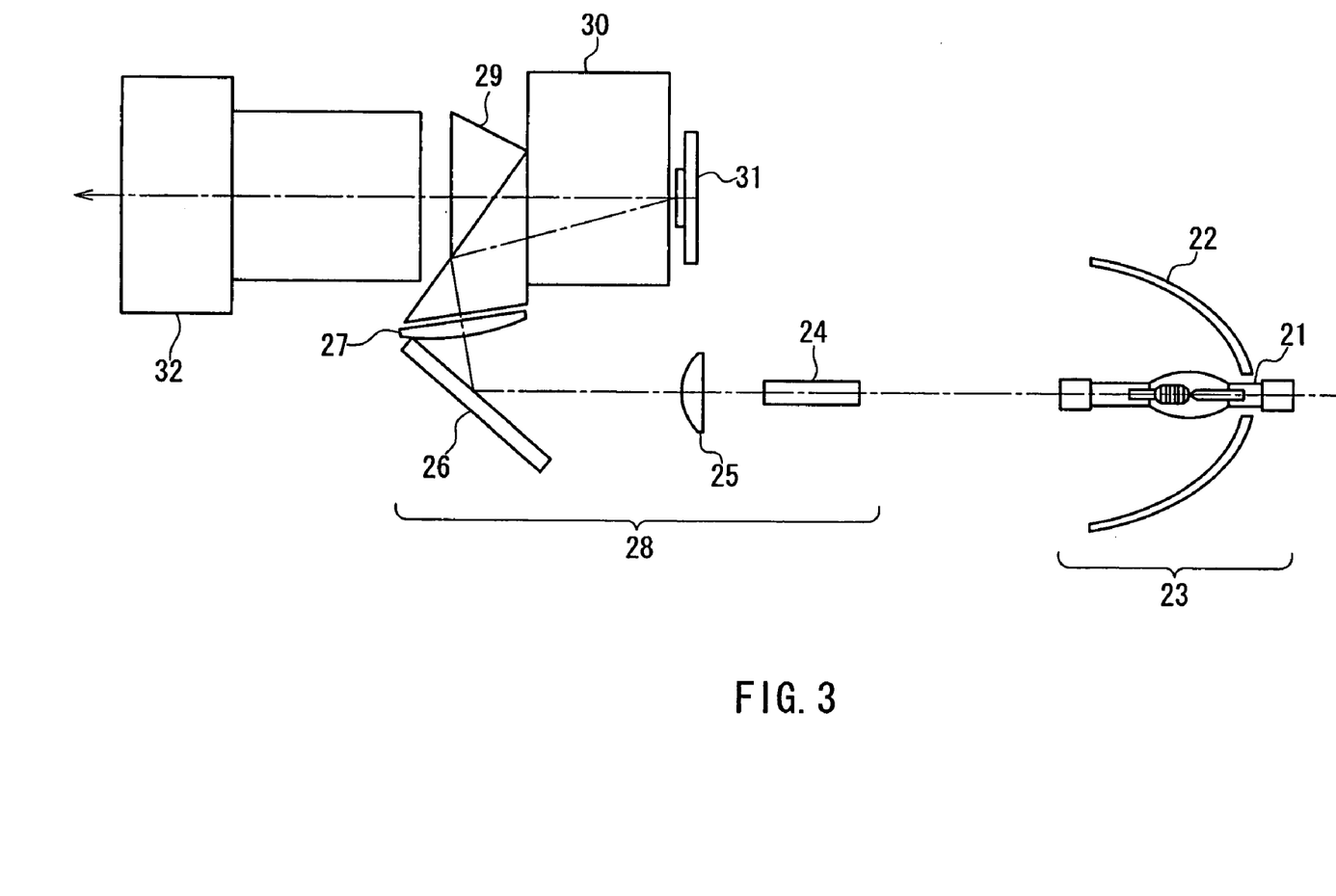
FIG. 3 is a view showing a schematic configuration of a projection-type display unit according to one embodiment of the present invention.

FIG. 3 shows a schematic configuration of a projection-type display unit in Embodiment 1 of the present invention. In FIG. 3, reference numeral 23 denotes a light source, 28 denotes an illumination optical system, 30 denotes a color separating and synthesizing prism (color separating and synthesizing optical system), 31 denotes a light valve, and 32 denotes a projection lens.

In the reflection-type light valve 31, mirror elements are arranged in a matrix on the pixel basis, and the tilt of the mirror elements is varied depending upon a video signal to change a reflection angle, whereby the traveling direction of light is modulated to form an optical image.

The light source 23 is composed of a lamp 21 and a concave mirror 22. The concave mirror 22 is an ellipsoidal mirror in which a cross-sectional shape of a reflection surface forms an ellipse, and has a first focal point and a second focal point. A xenon lamp is used as the lamp 21. The center of an illuminant is positioned in the vicinity of the first focal point of the concave mirror 22, and the light incident surface of a rod prism 24 is positioned in the vicinity of the second focal point of the concave mirror 22. Furthermore, the concave mirror 22 is configured by forming an optical multi-layered film that transmits infrared light and reflects visible light on an inner surface of a glass substrate.

The illumination optical system 28 is composed of the rod prism 24, a condenser lens 25, a total reflection mirror 26, and a field lens 27. The rod prism 24 is a quadratic prism in which an incident surface and an output surface of light have the same aspect ratio as that of an effective display surface of the reflection-type light valve 31, and is positioned at a place where light emitted from the light source 23 is condensed, so that the rod prism 24 is made of quartz glass excellent in heat resistance. An illuminant image of the lamp 21 condensed by the concave mirror 22 is formed in the vicinity of the incident surface of the rod prism 24. There is a tendency for the illuminant image of the lamp 21 condensed by the concave mirror 22 to be brightest in the vicinity of a center close to the optical axis, and becomes dark rapidly toward the circumference, so that the brightness is non-uniform on the incident surface. In contrast, a luminous flux incident upon the rod prism 24 is subjected to multiple reflection on a side surface of the rod prism 24, and the illuminant image is minutely divided and overlapped by the number of reflections, so that the brightness is made uniform on the output surface of the rod prism 24. Thus, as the number of reflections in the rod prism 24 is larger, the effect of minute division and overlapping of the illuminant image of the lamp is increased to enhance uniformity. Therefore, the degree of uniformity depends upon the length of the rod prism 24. In the present embodiment, the length of the rod prism 24 was set so that the circumferential illumination on a screen was 90% or more with respect to the central illumination.

As described above, by setting the output surface of the rod prism 24, in which brightness is made uniform, as a secondary surface light source, and forming an output surface image in the effective display region of the reflection-type light valve 31 with the condenser lens 25 and the field lens 27 positioned in a later stage, at a magnification that is matched with the effective display area of the reflection-type light valve 31, both the securing of a condensing efficiency and the enhancement of uniformity can be satisfied.

The illumination light output from the field lens 27 is incident upon a total reflection prism 29. The total reflection prism 29 is composed of two prisms, and a very thin air layer is formed on a proximity surface of the prisms. The angle of the air layer is set so that the illumination light output from the field lens 27 is incident upon the air layer at an angle equal to or higher than a critical angle, and totally reflected therefrom to be diagonally incident upon the reflection-type light valve 31, and light (hereinafter referred to as ON light) reflected from the light valve 31 as a projected image is incident upon and transmitted through the air layer at an angle equal to or lower than a critical angle to be incident upon the projection lens 32. Thus, the entire optical system can be configured with a compact size by providing the total reflection prism 29.

The color separating and synthesizing prism 30 is placed between the total reflection prism 29 and the reflection-type light valve 31, and three reflection-type light valves 31 for red, green and blue light are used.

Hereinafter, the configuration and function of the color separating and synthesizing prism 30 will be described with reference to FIG. 4.

Figure 4:
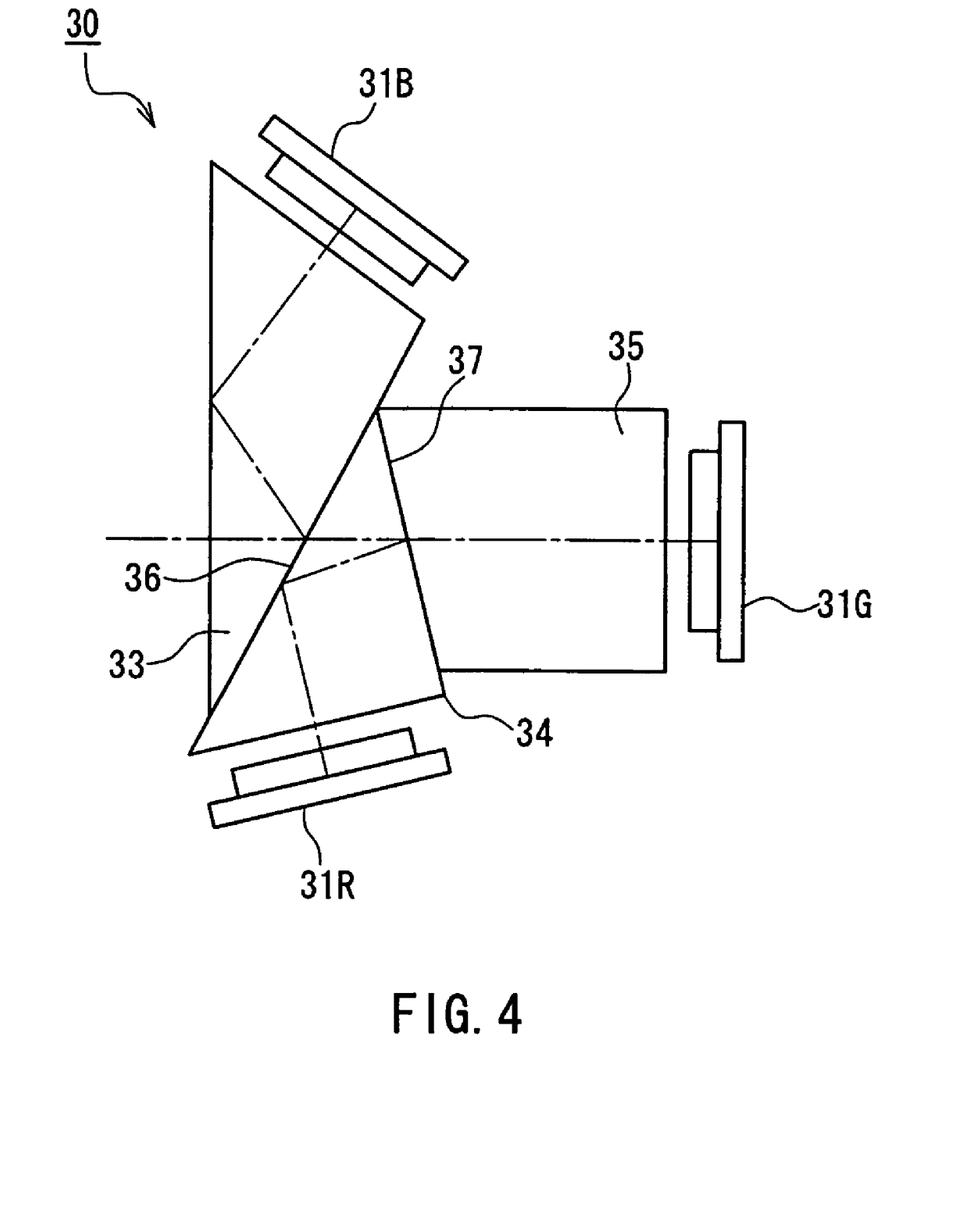
FIG. 4 is a view showing a schematic configuration of a color separating and synthesizing optical system of the projection-type display unit shown in FIG. 3.

FIG. 4 is a cross-sectional view in a horizontal direction of the color separating and synthesizing prism 30 shown in FIG. 3. The color separating and synthesizing prism 30 includes three prisms (first prism 33, second prism 34, and third prism 35). A blue reflecting dichroic mirror 36 is provided on a proximity surface between the first prism 33 and the second prism 34, and a red reflecting dichroic mirror 37 is provided on a proximity surface between the second prism 34 and the third prism 35. The blue reflecting dichroic mirror 36 is the one configured as shown in FIGS. 1 and 2, and Table 1, and is formed on the first prism 33 side. An air layer is formed between the first prism 33 and the second prism 34, and the incident angle of light from the first prism 33 side with respect to the blue reflecting dichroic mirror 36 is 29°, and the output angle of this light to the air layer side is 47.4°. Furthermore, the red reflecting dichroic mirror 37 is formed on the second prism 34 side, and the second prism 34 and the third prism 35 are bonded to each other with the red reflecting dichroic mirror 37 interposed therebetween. The incident angle of light from the second prism 34 side with respect to the red reflecting dichroic mirror 37, and the output angle of this light to the third prism 35 side are 10°. The red reflecting dichroic mirror 37 has the same spectral transmittance characteristics as those of the conventional red reflecting dichroic mirror shown in FIG. 10B.

The light from the total reflection prism 29 is first incident upon the blue reflecting dichroic mirror 36, and blue light reflected therefrom is incident upon a reflection-type light valve 31B for blue light. Then, the light transmitted through the blue reflecting dichroic mirror 36 is incident upon the red reflecting dichroic mirror 37, and the red light reflected therefrom is incident upon a reflection-type light valve 31R for red light. Then, green light transmitted through both the blue reflecting dichroic mirror 36 and the red reflecting dichroic mirror 37 is incident upon a reflection-type light valve 31G for green light. Light beams of three colors are reflected by the respective corresponding reflection-type light valves 31B, 31R, and 31G, and then, synthesized into one beam by the blue reflecting dichroic mirror 36 and the red reflecting dichroic mirror 37 to be incident upon the total reflection prism 29. Thus, white light is separated into light beams of three primary colors of red, blue, and green, and the light beams of the respective colors are modulated with the three reflection-type light valves 31B, 31R, and 31G corresponding to respective video signals and then, synthesized, whereby a full-color high-definition projected image can be displayed.

Among illumination light incident upon the reflection-type light valves 31B, 31R, and 31G, ON light corresponding to a white display is transmitted through the total reflection prism 29 and the projection lens 32 to be magnified and projected onto a screen (not shown). On the other hand, OFF light corresponding to a black display travels outside of an effective diameter of the projection lens 32, and does not reach the screen.

Figure 5:
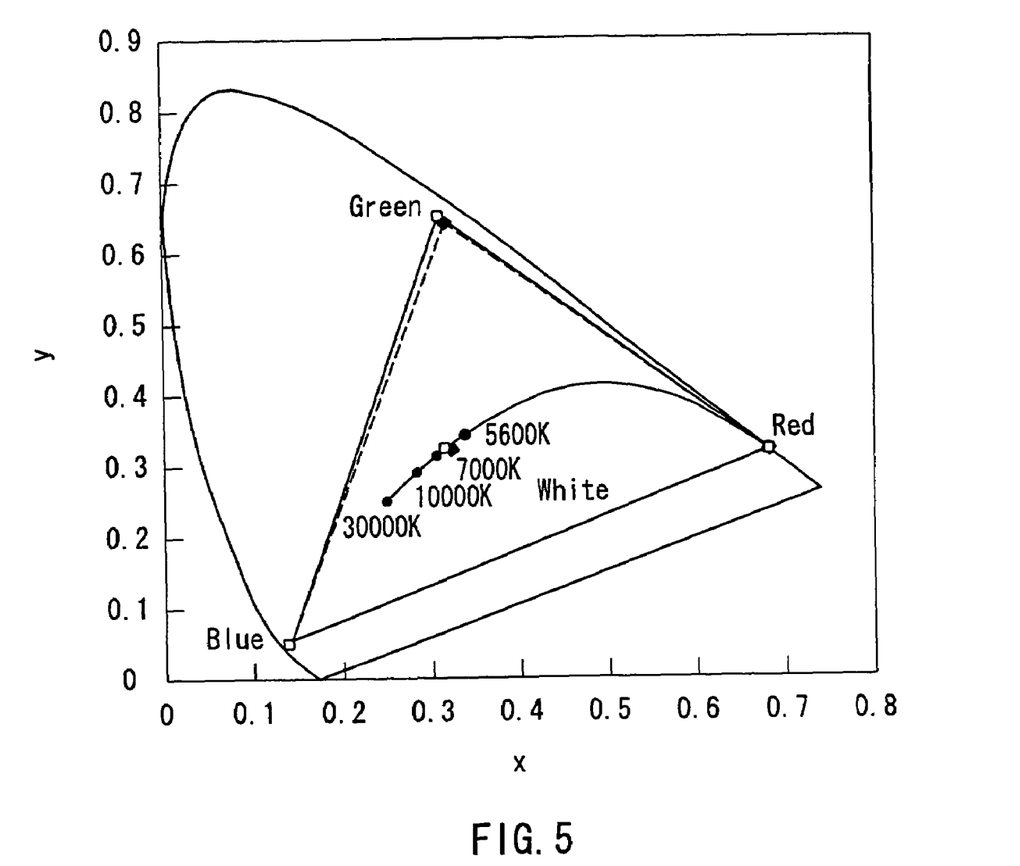
FIG. 5 is an xy chromaticity coordinates graph of a projected image of the projection-type display unit according to Embodiment 1 of the present invention.

The chromaticity of a projected image projected from the projection-type display unit of the present embodiment is shown in an xy chromaticity coordinates graph of FIG. 5. Among triangles obtained by connecting chromaticity coordinates of Red, Green, and Blue in FIG. 5, the solid line represents the characteristics of a projected image using the blue reflecting dichroic mirror of the present embodiment as a blue reflecting dichroic mirror, and the broken line represents the characteristics of a projected image using a conventional blue reflecting dichroic mirror. A larger area of the triangle indicates that a color reproduction range is larger. In the present embodiment, a line connecting Green to Blue is placed outside, compared with the conventional example, and hence, it is understood that a color reproduction range is large.

Furthermore, the spectrum utilization efficiency is increased by about 4% in the present embodiment, compared with the conventional example, and hence, the present embodiment is advantageous even in terms of an optical output. Furthermore, in the conventional example, if the above-mentioned color correction filters as shown in FIG. 12 are used for the purpose of realizing a color reproduction range equal to that of the present embodiment, the spectrum utilization efficiency is decreased. Therefore, in the present embodiment, the optical output is more advantageous by 10 to 15%, compared with the case of using the color correction filters of the conventional example. Thus, there is a remarkable effect in that both the color reproduction and the optical output are satisfied.

In the present embodiment, a reflection-type light valve for modulating the traveling direction of light is used as a light valve. However, even in the case where a reflection-type light valve of other systems or a transmission-type light valve is used, a color separating and synthesizing optical system using the dichroic mirror of the present embodiment can obtain the same effect as described above, as long as the light valve modulates natural light.

Furthermore, the dichroic mirror of the present embodiment exhibits the effect especially when the incident angle of light in terms of air conversion is 30° or more. Thus, the present embodiment adopts the configuration in which three prisms are combined as a color separating and synthesizing optical system, and the light incident angle in terms of air conversion to the blue reflecting dichroic mirror is 47.4°. However, as long as the light incident angle in terms of air conversion to the dichroic mirror is 30° or more, the same effects are obtained even in color separating and synthesizing optical systems with other configurations.

(Embodiment 2)

Figure 6:
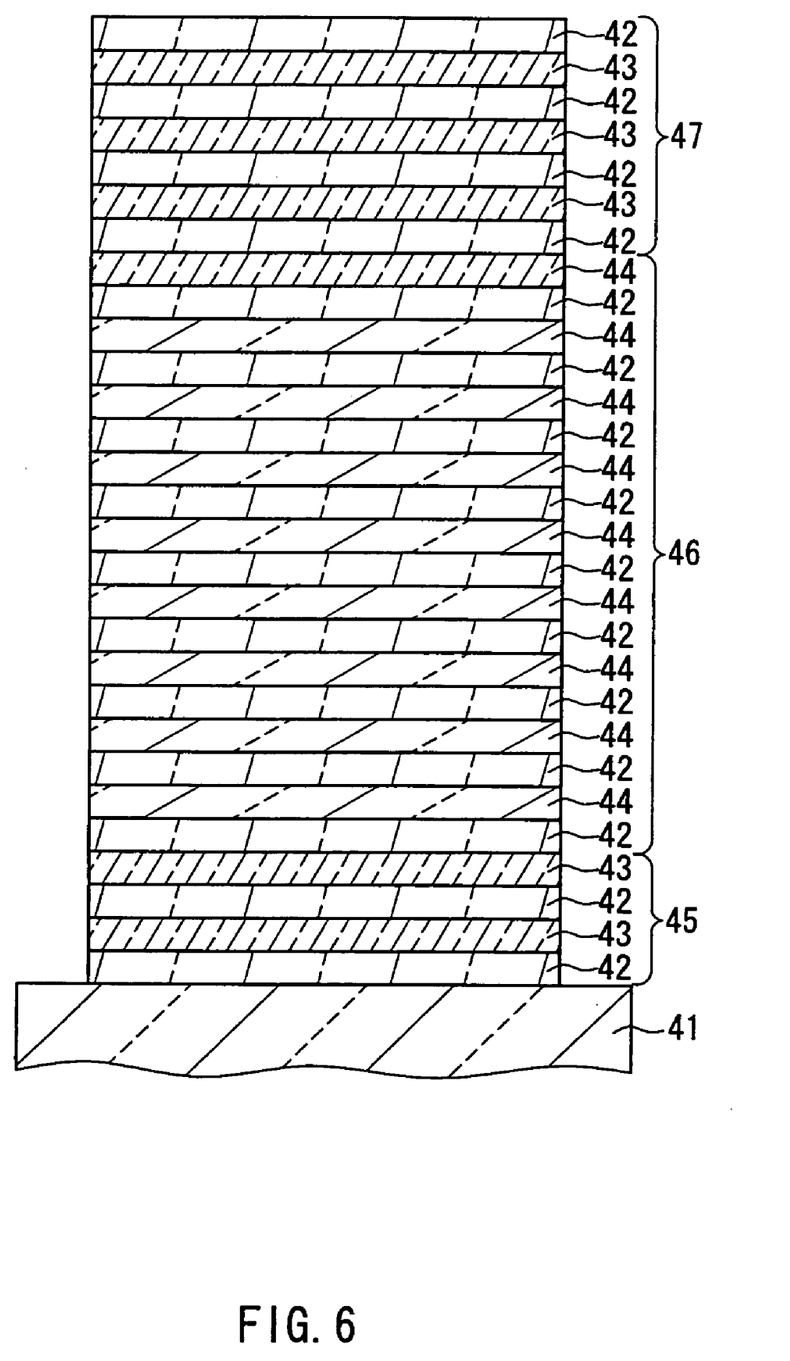
FIG. 6 is a cross-sectional view showing a schematic configuration of a blue reflecting dichroic mirror according to Embodiment 2 of the present invention.

FIG. 6 is a cross-sectional view showing a schematic configuration of a blue reflecting dichroic mirror in Embodiment 2 of the present invention. In FIG. 6, reference numeral 41 denotes a transparent glass substrate, 42 denotes a low-refractive-index layer, 43 denotes a high-refractive-index layer, 44 denotes an intermediate-refractive-index layer, 45 denotes a first alternating periodic layer, 46 denotes a second alternating periodic layer, and 47 denotes a third alternating periodic layer.

Table 2 shows the material and film thickness of each layer in FIG. 6. The main design wavelength is 475 nm, and the film thickness of each layer in Table 2 is displayed in terms of an optical film thickness obtained by multiplying the refractive index of a thin film by the physical film thickness thereof, wherein the film thickness that is ¼ of the main design wavelength is assumed to be 1.

TABLE 2

| Medium | Material Air | Film thickness |
|---|---|---|
| 29 | $SiO_2$ | 1.106 |
| 28 | $Nb_2O_5$ | 0.574 |
| 27 | $SiO_2$ | 0.847 |
| 26 | $Nb_2O_5$ | 1.023 |
| 25 | $SiO_2$ | 0.993 |
| 24 | $Nb_2O_5$ | 0.752 |

TABLE 2-continued

| Medium | Material Air | Film thickness |
|---|---|---|
| 23 | $SiO_2$ | 1.046 |
| 22 | $SiO_2/Nb_2O_5$ | 1.364 |
| 21 | $SiO_2$ | 0.808 |
| 20 | $SiO_2/Nb_2O_5$ | 1.364 |
| 19 | $SiO_2$ | 0.808 |
| 18 | $SiO_2/Nb_2O_5$ | 1.364 |
| 17 | $SiO_2$ | 0.808 |
| 16 | $SiO_2/Nb_2O_5$ | 1.364 |
| 15 | $SiO_2$ | 0.808 |
| 14 | $SiO_2/Nb_2O_5$ | 1.364 |
| 13 | $SiO_2$ | 0.808 |
| 12 | $SiO_2/Nb_2O_5$ | 1.364 |
| 11 | $SiO_2$ | 0.808 |
| 10 | $SiO_2/Nb_2O_5$ | 1.364 |
| 9 | $SiO_2$ | 0.808 |
| 8 | $SiO_2/Nb_2O_5$ | 1.364 |
| 7 | $SiO_2$ | 0.808 |
| 6 | $SiO_2/Nb_2O_5$ | 1.364 |
| 5 | $SiO_2$ | 0.808 |
| 4 | $Nb_2O_5$ | 1.076 |
| 3 | $SiO_2$ | 0.664 |
| 2 | $Nb_2O_5$ | 1.019 |
| 1 | $SiO_2$ | 1.907 |
| Substrate | BK7 | |

The first alternating periodic layer 45 including the low-refractive-index layers 42 and the high-refractive-index layers 43; the second alternating periodic layer 46 including the low-refractive-index layers 42 and the intermediate-refractive-index layers 44, and the third alternating periodic layer 47 including the low-refractive-index layers 42 and the high-refractive-index layers 43 are formed successively on the transparent glass substrate 41. The number of periods of the second alternating periodic layer 46 is 9, the total number of layers thereof is 18, and the total number of layers of the first alternating periodic layer 45 and the third alternating periodic layer 47 is 11. Thus, there are 29 layers as a whole.

The low-refractive-index layers 42 are made of $SiO_2$ and have a refractive index of 1.46. The high-refractive-index layers 43 are made of $Nb_2O_5$ and have a refractive index of 2.3. The intermediate-refractive-index layers 44 are made of a mixed layer containing $SiO_2$ of the low-refractive-index layers 42 and $Nb_2O_5$ of the high-refractive-index layers 43, and have a refractive index of 1.9. The low-refractive-index layers 42 and the high-refractive-index layers 43 can be formed by vapor deposition. Furthermore, the intermediate-refractive-index layers 44 can be formed by simultaneously vapor-depositing $SiO_2$ and $Nb_2O_5$, and a desired refractive index is obtained by regulating each film-formation speed to control the mixed ratio. If reactive sputtering that uses a Si substrate and a Nb substrate as vapor deposition targets is adopted as a film-formation method, satisfactory intermediate-refractive-index layers with high reproducibility of a refractive index can be formed.

In the present embodiment, $Nb_2O_5$ is used for the high-refractive-index layers; however, instead of this, $TiO_2$ may be used.

The first alternating periodic layer 45 and the third alternating periodic layer 47 have functions of obtaining a wavelength band sufficient for reflecting blue light, and minimizing ripples generated in a transmission wavelength band of green light and red light by optimizing a film thickness. Furthermore, the second alternating periodic layer 46 has a function of subjecting blue light and green light to wavelength separation satisfactorily.

Figure 7:
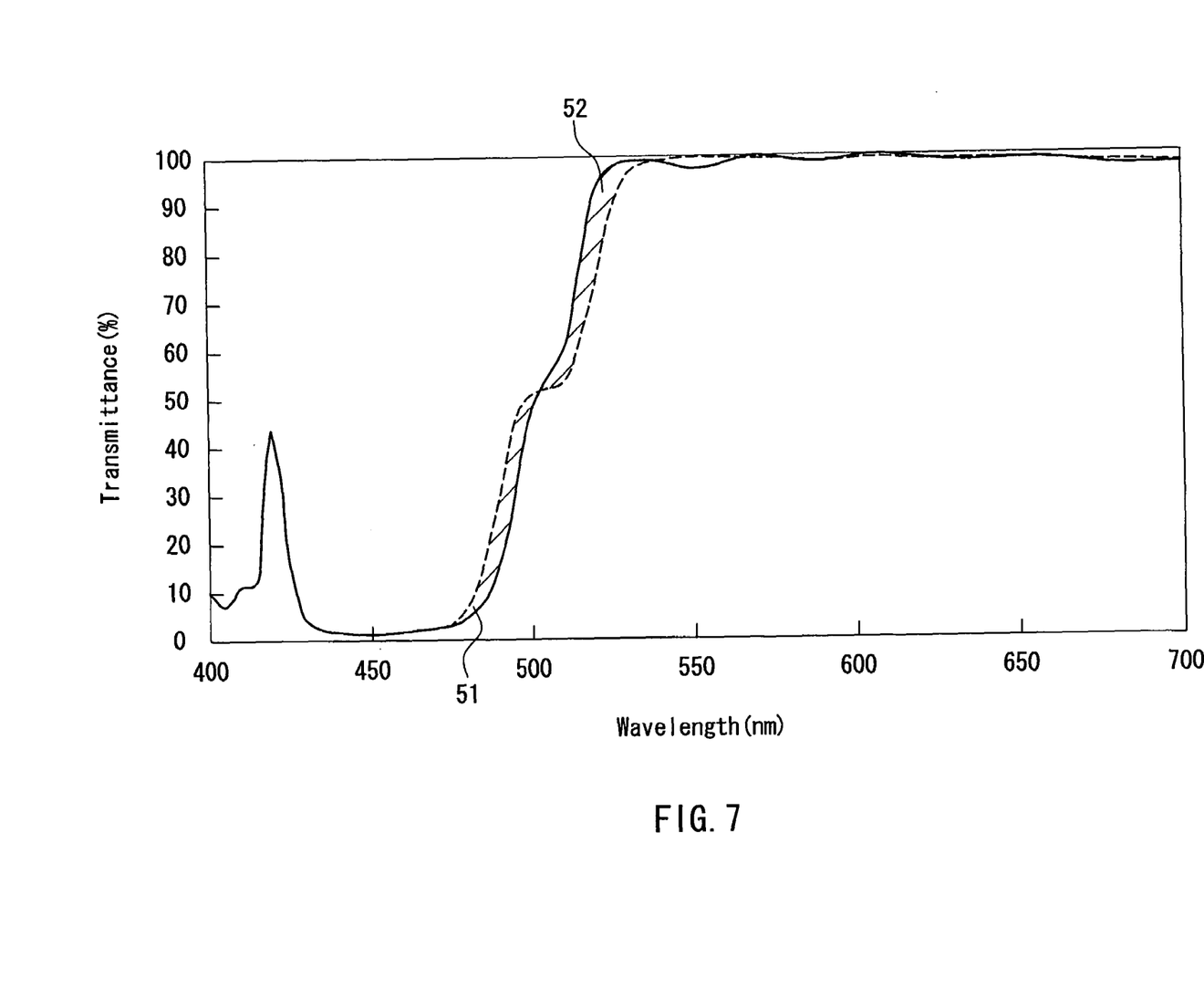
FIG. 7 is a graph showing spectral transmittance characteristics of the blue reflecting dichroic mirror according to Embodiment 2 of the present invention.

FIG. 7 shows spectral transmittance characteristics of a blue reflecting dichroic mirror with a multi-layered film configuration shown in FIG. 6 and Table 2. In FIG. 7, the solid line indicates a spectral transmittance of the blue reflecting dichroic mirror of the present embodiment, and the broken line indicates a spectral transmittance of the conventional blue reflecting dichroic mirror shown in FIG. 10A. The incident angle of light from a medium (air) side is 47.4° in the present embodiment in the same way as in the conventional example. As is understood from the comparison with the spectral transmittance curve of the conventional example, even in the multi-layered film configuration of the present embodiment, a curve in a wavelength separating band in the vicinity of a half-value wavelength is linear, blue light 51 in a shaded portion transmitted on a green side in the conventional example can be reflected on a blue side, and green light 52 in the shaded portion reflected on a blue side can be transmitted on a green side.

In the case of configuring the dichroic mirror of the present embodiment as described above, the refractive index of the intermediate-refractive-index layer 44 desirably is 1.8 to 2.0. In the case where the refractive index is smaller than 1.8, the curve in the wavelength separating band of spectral transmittance characteristics approaches the broken line in FIG. 6, whereby satisfactory wavelength separating performance that is a feature of the present invention is unlikely to be obtained. Furthermore, in the case where the refractive index is larger than 2.0, the difference in refractive index with respect to the low-refractive-index layers 42 configuring the second alternating periodic layer 46 becomes small, whereby a reflection wavelength band sufficient for reflecting blue light is unlikely to be obtained.

Furthermore, the number of periods of the second alternating periodic layer 46 desirably is 7 to 12. In the case where the number of periods is smaller than 7, the satisfactory wavelength separating characteristics as in the present embodiment shown in FIG. 7 are unlikely to be obtained. In the case where the number of periods is larger than 12, a change in spectral transmittance characteristics is decreased, and hence, the effect of the increase in number of periods is decreased.

Furthermore, the total number of layers of the first alternating periodic layer 45 and the third alternating periodic layer 47 desirably is 7 to 12. In the case where the total number of layers is smaller than 7, a reflection wavelength band sufficient for blue light is unlikely to be obtained, or sufficient reflectance is unlikely to be obtained. In the case where the total number of layers is larger than 12, a change in spectral transmittance characteristics is decreased, and hence, the effect of the increase in number of layers is decreased.

Figure 8:
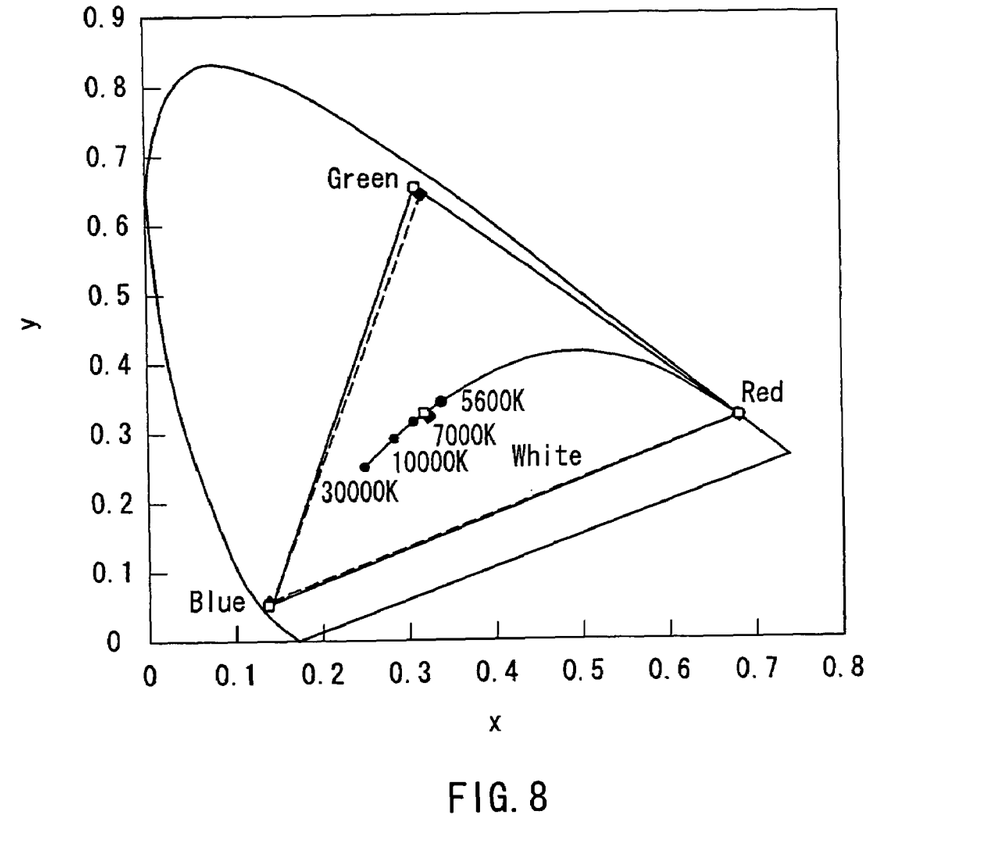
FIG. 8 is an xy chromaticity coordinates graph of a projected image of the projection-type display unit using the blue reflecting dichroic mirror according to Embodiment 2 of the present invention.

An xy chromaticity coordinates graph of FIG. 8 shows chromaticity of a projected image in the case of using the blue reflecting dichroic mirror of the present embodiment as the blue reflecting dichroic mirror 36 in the color separating and synthesizing prism 30 shown in FIG. 4 of the projection-type display unit of FIG. 3 described in Embodiment 1.

Among triangles obtained by connecting chromaticity coordinates of Red, Green, and Blue in FIG. 8, the solid line indicates the characteristics of a projected image using the blue reflecting dichroic mirror of the present embodiment as a blue reflecting dichroic mirror, and the broken line indicates the characteristics of a projected image using a conventional blue reflecting dichroic mirror. Even in the present embodiment, a line connecting Green to Blue is placed outside, compared with the conventional example, and hence, it is understood that the color reproduction range is large.

Furthermore, the spectrum utilization efficiency is increased by about 2% in the present embodiment, compared with the conventional example, and hence, the present embodiment is advantageous even in terms of an optical output. Furthermore, in the same way as in Embodiment 1, in the conventional example, if the color correction filters as shown in FIG. 12 are used for the purpose of realizing a color reproduction range equal to that of the present embodiment, a spectrum utilization efficiency is decreased. Therefore, in the present embodiment, the optical output is more advantageous by 10 to 15%, compared with the case of using the color correction filters of the conventional example. Thus, there is a remarkable effect in that both the color reproduction and the optical output are satisfied.

The dichroic mirror of the present embodiment also exhibits the effect especially when the incident angle of light in terms of air conversion is 30° or more. Thus, the present embodiment also adopts the configuration in which three prisms are combined as a color separating and synthesizing optical system, and the light incident angle in terms of air conversion to the blue reflecting dichroic mirror is 47.4°. However, as long as the light incident angle in terms of air conversion to the dichroic mirror is 30° or more, the same effects are obtained even in color separating and synthesizing optical systems with other configurations.

Figure 9:
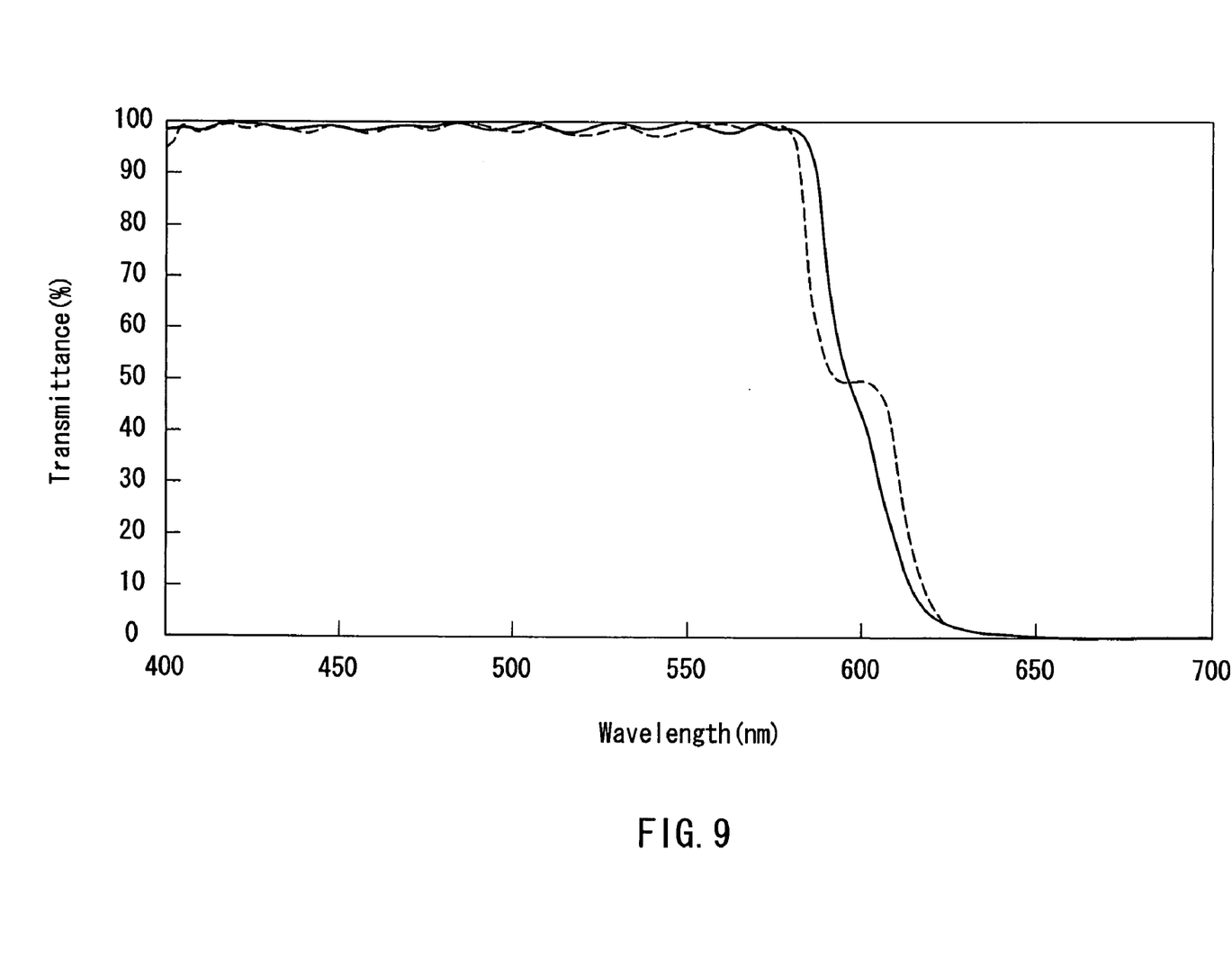
FIG. 9 is a graph showing spectral transmittance characteristics of the red reflecting dichroic mirror according to one embodiment of the present invention.

FIG. 9 shows exemplary spectral transmittance characteristics of a red reflecting dichroic mirror with a light incident angle in terms of air conversion of 47.4°, in the same way as in the case of the blue reflecting dichroic mirrors of the above-mentioned Embodiments 1 and 2. The solid line in FIG. 9 indicates the characteristics of the red reflecting dichroic mirror composed of a multi-layered film that has three alternating periodic layers including intermediate-refractive-index layers as described in the above-mentioned Embodiments 1 and 2, and the broken line indicates the characteristics of the red reflecting dichroic mirror composed of only alternating periodic layers of two kinds of refractive layers in the same way as in the conventional example. It is understood that, in the red reflecting dichroic mirror of the present invention indicated by the solid line, a curve in a wavelength separating band in the vicinity of a half-value wavelength is linear. In any of Embodiments 1 and 2, the case where the present invention is applied to a blue reflecting dichroic mirror has been shown. However, as is understood from FIG. 9, the present invention is applicable to a red reflecting dichroic mirror with a large light incident angle in terms of air conversion, and even in this case, the same effects as those in the above-mentioned Embodiments 1 and 2 can be obtained.

Any of the embodiments described above are intended to clarify the technical contents of the present invention. The present invention is not to be interpreted by being limited to such specific examples, and can be carried out by being varied within the spirit of the present invention and the scope of the claims. Thus, the present invention should be interpreted in a wide sense.

The invention claimed is:

1. A dichroic mirror, comprising: on a transparent substrate, a first alternating periodic layer including low-refractive-index layers and high-refractive-index layers; a second alternating periodic layer including intermediate-refractive-index layers and the high-refractive-index layers; and a third alternating periodic layer including the low-refractive-index layers and the high-refractive-index layers in this order, wherein a refractive index of the intermediate-refractive-index layers is higher than that of the low-refractive-index layers and lower than that of the high-refractive-index layers, and the intermediate-refractive-index layers contain materials for the low-refractive-index layers and the high-refractive-index layers.

2. The dichroic mirror according to claim 1, wherein the refractive index of the intermediate-refractive-index layers is 1.6 to 1.8.

3. The dichroic mirror according to claim 1, wherein a number of periods of the second alternating periodic layer is 7 to 12, and a total number of layers of the first alternating periodic layer and the third alternating periodic layer is 7 to 12.

4. The dichroic mirror according to claim 1, wherein the low-refractive-index layers are made of $SiO_2$, and the high-refractive-index layers are any of $Nb_2O_5$, $Ta_2O_5$, $TiO_2$, and $ZrO_2$, or a mixture thereof.

5. A projection-type display unit, comprising: a light source; a light valve as image forming means; an illumination optical system for condensing light emitted from the light source onto the light valve; a color separating and synthesizing optical system for separating illumination light from the illumination optical system into light beams of three primary colors of red, green, and blue, and synthesizing the light beams of three primary colors; and a projection lens for magnifying and projecting an optical image formed on the light valve onto a screen, wherein the color separating and synthesizing optical system includes at least one dichroic mirror of claim 1.

6. The projection-type display unit according to claim 5, wherein the color separating and synthesizing optical system includes a blue reflecting dichroic mirror and a red reflecting dichroic mirror, and an incident angle of a light beam from a medium side with respect to at least one of the dichroic mirrors is 30° or more.

7. A dichroic mirror, comprising: on a transparent substrate, a first alternating periodic layer including low-refractive-index layers and high-refractive-index layers; a second alternating periodic layer including the low-refractive-index layers and intermediate-refractive-index layers; and a third alternating periodic layer including the low-refractive-index layers and the high-refractive-index layers in this order, wherein a refractive index of the intermediate-refractive-index layers is higher than that of the low-refractive-index layers and lower than that of the high-refractive-index layers, and the intermediate-refractive-index layers contain materials for the low-refractive-index layers and the high-refractive-index layers.

8. The dichroic mirror according to claim 7, wherein the refractive index of the intermediate-refractive-index layers is 1.8 to 2.

9. The dichroic mirror according to claim 7, wherein a number of periods of the second alternating periodic layer is 7 to 12, and a total number of layers of the first alternating periodic layer and the third alternating periodic layer is 7 to 12.

10. The dichroic mirror according to claim 7, wherein the low-refractive-index layers arc made of $SiO_2$, and the high-refractive-index layers are any of $Nb_2O_5$ and $TiO_2$.

11. A projection-type display unit, comprising: a light source; a light valve as image forming means; an illumination optical system for condensing light emitted from the light source onto the light valve; a color separating and synthesizing optical system for separating illumination light from the illumination optical system into light beams of three primary colors of red, green, and blue, and synthesizing the light beams of three primary colors; and a projection lens for magnifying and projecting an optical image formed on the light valve onto a screen, wherein the color separating and synthesizing optical system includes at least one dichroic mirror of claim 7.

12. The projection-type display unit according to claim 11, wherein the color separating and synthesizing optical system includes a blue reflecting dichroic mirror and a red reflecting dichroic mirror, and an incident angle of a light beam from a medium side with respect to at least one of the dichroic mirrors is 30° or more.

* * * * *